United States Patent
Breitschafter et al.

(10) Patent No.: US 8,068,520 B2
(45) Date of Patent: Nov. 29, 2011

(54) METHOD FOR GENERATING A LASER PULSE FOR THE FINE MACHINING OF WORKPIECES USING A FIBER LASER

(75) Inventors: Max Breitschafter, Munich (DE); Wulf Polack, Munich (DE)

(73) Assignee: ROFIN-BAASEL Lasertech GmbH & Co. KG, Starnberg (DE)

( * ) Notice: Subject to any disclaimer, the term of this patent is extended or adjusted under 35 U.S.C. 154(b) by 998 days.

(21) Appl. No.: 11/491,005

(22) Filed: Jul. 20, 2006

(65) Prior Publication Data
US 2007/0017905 A1    Jan. 25, 2007

(30) Foreign Application Priority Data
Jul. 21, 2005  (DE) .................. 10 2005 034 106

(51) Int. Cl.
*H01S 3/30* (2006.01)
*H01S 3/082* (2006.01)
*H01S 3/08* (2006.01)
*H01S 3/10* (2006.01)

(52) U.S. Cl. ............... 372/6; 372/97; 372/108; 372/26

(58) Field of Classification Search ................ 372/6, 97, 372/108, 26
See application file for complete search history.

(56) References Cited

U.S. PATENT DOCUMENTS

| | | | | |
|---|---|---|---|---|
| 5,059,764 | A | * | 10/1991 | Baer ................... 219/121.68 |
| 5,393,371 | A | * | 2/1995 | Chang et al. ................ 216/24 |
| 5,642,067 | A | * | 6/1997 | Grace ........................ 327/134 |
| 5,719,372 | A | * | 2/1998 | Togari et al. ........... 219/121.61 |
| 6,980,571 | B1 | * | 12/2005 | Press et al. ................. 372/10 |
| 2005/0035101 | A1 | | 2/2005 | Jones et al. |

OTHER PUBLICATIONS

Zervas, et al., "Single and few-moded high power fibre lasers for industrial applications" Southampton Photonics, Inc.

* cited by examiner

*Primary Examiner* — Patrick Stafford
(74) *Attorney, Agent, or Firm* — Fulbright & Jaworski L.L.P.

(57) ABSTRACT

Method for generating a laser pulse for the fine machining of workpieces using a fiber laser, the laser fiber of which is optically pumped by use of at least one diode laser which is operated by a current pulse whose slew rate, pulse height, and pulse length are adjusted in adaptation to the laser fiber in such a way that the laser pulse (22) is initially composed of a primary relaxation pulse (A), independently of the pulse length of the current pulse.

7 Claims, 2 Drawing Sheets

— Stand der Technik —

METHOD FOR GENERATING A LASER PULSE FOR THE FINE MACHINING OF WORKPIECES USING A FIBER LASER

RELATED APPLICATION

This application claims benefit from German Patent Application No. 10 2005 034 106.3 filed Jul. 21, 2005, incorporated by reference in its entirety.

TECHNICAL FIELD OF INVENTION

The invention relates to a method for generating a laser pulse for the fine machining of workpieces using a fiber laser.

BACKGROUND OF THE INVENTION

In the fine machining of workpieces using a laser, in particular in the precision cutting of. stents, the process parameters must be matched to the respective material, particularly for critical materials such as nitinol, or alloys based on cobalt (Co) and chromium (Cr), in order to achieve an optimum process result. These process parameters on the one hand are determined by the characteristics of the laser beam itself, and on the other hand are specified by additional physical parameters independent of the laser beam, such as the type of shield gas, the gas pressure during laser machining, the feed rate, or the machining geometry, in particular the geometry of the cuts being made. The important parameters with respect to the laser beam are essentially the wavelength, the beam quality, the beam caustic, the average power and energy introduced into the workpiece, the shape and length of the pulse in lasers operating in pulse mode, and the repetition rate of the laser pulses.

In particular for precision cutting, the characteristics of the cutting edges, such as their shape, any burrs present and their removability, or roughness, are sensitive to influence from these process parameters, and in the manufacture of stents are of critical importance for the problem-free therapeutic use thereof.

For precision cutting of stents, Nd:YAG solid-state lasers have generally been used heretofore which operate in pulse mode and are optically pumped using flash lamps. For such a laser, however, the above-referenced process parameters with respect to the laser beam cannot always be optimized to the particular process, since these process parameters cannot be adjusted independently of one another. Thus, for pulse durations <100 µs, for example, which are necessary in particular for precision cutting, the pulse energy of a laser pulse is coupled with the peak pulse power and the pulse duration. A typical laser pulse is diagrammatically illustrated in FIG. 4, in which the power output of the laser is plotted versus time. It is seen from the figure that the laser pulse is composed of multiple individual pulses—so-called "spikes"—which, starting from an initial pulse, die out in an approximately exponential manner to a constant power level (CW power). This pulse shape is essentially independent of the energy introduced into the laser-active medium by the flash lamp. In this manner, for example, an increase in the pulse energy is always associated with an increase in the peak pulse power of the initial pulse, and/or with an extension of the pulse duration. In addition, for technical reasons the pulse frequency is limited to values below 3 kHz.

A laser cutter for manufacturing stents is known from US 2005/0035101 A1, in which a diode-pumped fiber laser is used to avoid the above-referenced problems. In this known laser cutter a function generator is used to actuate the diode laser used for pumping, which allows shaping of the pump laser pulse generated by the diode laser. In this manner, pulse shapes for the laser pulse generated by the fiber laser are produced which correspond to the pulse shape of the current pulse which is used for operating the diode laser and controlled by the function generator.

OBJECTS OF THE PRESENT INVENTION

The object of the invention is to provide a method for generating a laser pulse for the fine machining of workpieces using a fiber laser, which allows the generation of a laser pulse that is particularly well suited for the fine machining of workpieces, in particular for the precision cutting of stents, using technically simple means.

The referenced object, based on a first variant of the method, is the laser fiber of a fiber laser is optically pumped by use of at least one diode laser which is operated by a current pulse whose slew rate, pulse height, and pulse length are adjusted in adaptation to the laser fiber in such a way that the laser pulse is composed of a primary relaxation pulse only. In this manner an individual laser pulse having a high peak power is generated by the fiber laser which is particularly suitable for the fine machining of workpieces, in particular for boring or cutting.

Based on a second variant of the method, object the laser fiber of a fiber laser is optically pumped by use of at least one diode laser which is operated by a current pulse having a first section with a first pulse height, and whose slew rate, pulse height, and pulse length are adjusted in adaptation to the laser fiber in such a way that the laser pulse has a primary relaxation pulse, and the first section is followed by at least one second section, having a second pulse height that is different from the first pulse height, in which the current is constant and whose duration is dimensioned such that, after the primary relaxation pulse, the fiber laser changes to CW mode with at least approximately constant power output. This measure allows the peak power of the relaxation pulse and the power in the subsequent CW mode to be adjusted independently of one another, so that the pulse shape of the laser pulse generated by the fiber laser may be flexibly modified to the particular material and the particular machining operation—removal, boring, cutting.

The invention is based on the operating characteristics of a fiber laser, known, for example, from M. N. Zerras et al., "Single and few-moded high power fibre lasers for industrial applications," presentation at the Advanced Laser Applications conference, November 2004, published at the Internet address www.spiotics.com/techpapers1.htm, according to which the laser fiber, when it is optically pumped with a high and rapidly increasing pump light power, i.e., when the laser diode used for optical pumping is actuated with a correspondingly high and rapidly increasing current pulse, is self-Q-switched due to the high power density in the laser fiber, resulting in a pronounced individual, narrow primary relaxation pulse, i.e., a peak pulse at the beginning of the laser pulse. Depending on the pulse length of the current pulse, this initial laser pulse or primary relaxation pulse is followed by additional smaller, secondary relaxation pulses before the fiber laser passes into CW mode having at least approximately constant power output.

Such a pulse shape having a high peak pulse at the beginning of the laser pulse, optionally followed by a CW region, has proven to be particularly advantageous for the manufacture of stents.

Further advantageous embodiments of the method are stated in the subclaims.

BRIEF DESCRIPTION OF THE DRAWINGS

For further explanation of the invention reference is made to the drawings, which show the following.

DETAILED DESCRIPTION OF THE EMBODIMENTS

Figure 1:
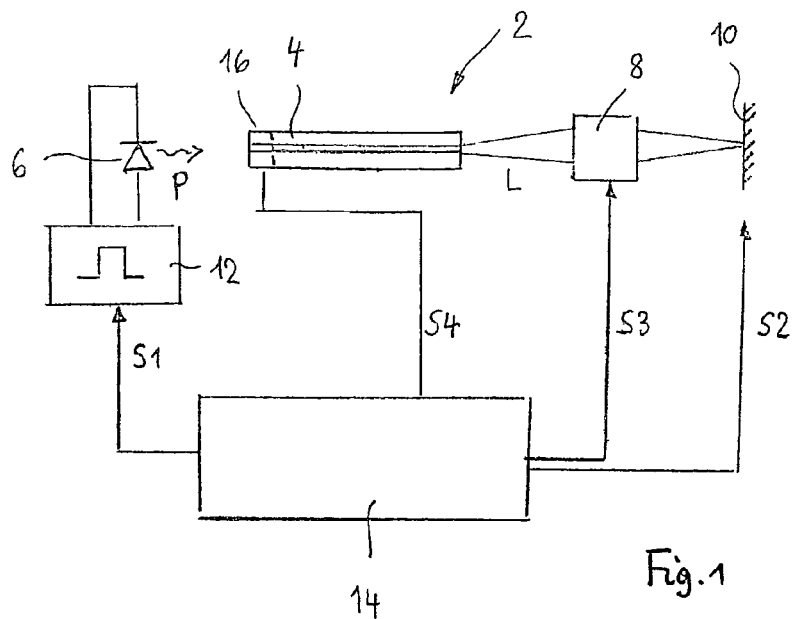
FIG. 1 shows a laser unit suitable for carrying out the method according to the invention, in a schematic block diagram.
Figure 4:
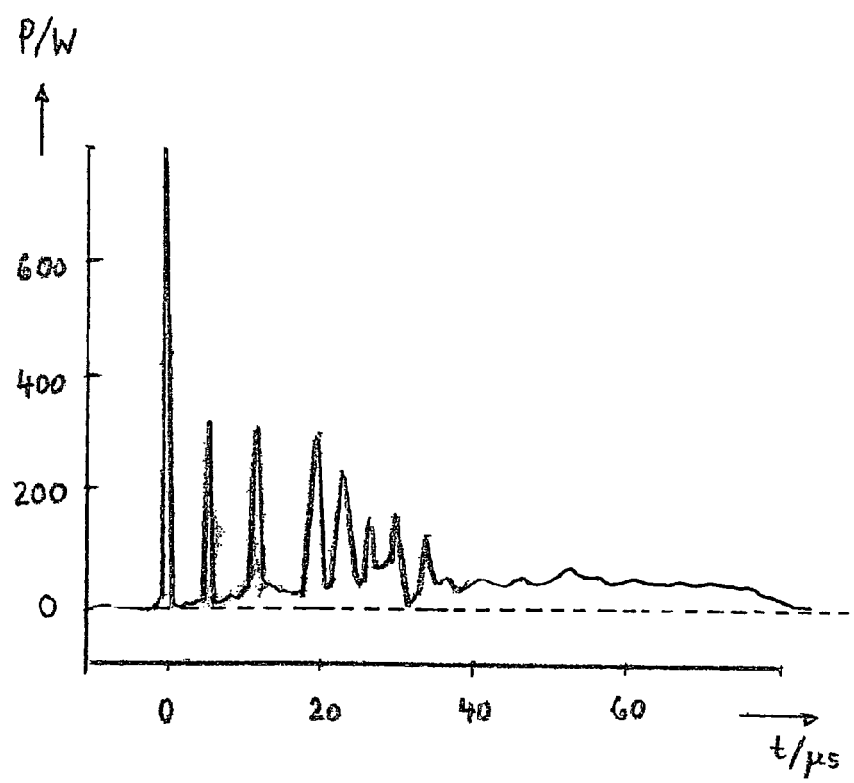
FIG. 4 shows a diagram in which the power output of a conventional lamp-pumped Nd:YAG solid-state laser is plotted versus time.

According to FIG. 1, a laser unit for the fine machining of workpieces comprises a fiber laser 2, the laser fiber 4 of which is optically pumped by a diode laser 6. The pump light P (pump laser pulse) emitted from the diode laser 6, which generally is a system composed of multiple individual emitters, is injected into the cladding of the laser fiber 4 and from there passes into the laser-active fiber core. The laser beam L generated by the laser fiber 4 is focused, using an imaging and beam guiding device 8 which is illustrated symbolically, on a workpiece 10 to be machined.

For pulse shaping of the laser beam L, the diode laser 6 is supplied with a current pulse from a pulse or function generator 12, the current pulse having a steep leading edge in order to generate a pulse-shaped laser beam L (laser pulse) which initially has a high primary relaxation pulse.

The pulse generator 12 is actuated by control signals S1 from a central control unit 14. This control unit 14 controls via additional control signals S2, S3 the relative motion between the workpiece 10 and the laser beam L, which as a rule is achieved by a feed motion of the workpiece 10, and also controls other process parameters for the machining operation.

Also schematically shown in the figure is an active Q-switch 16 which likewise is actuated by a corresponding control signal S4 from the control unit 14, and by which the width and height of the primary relaxation pulse may be additionally influenced.

Figure 2:
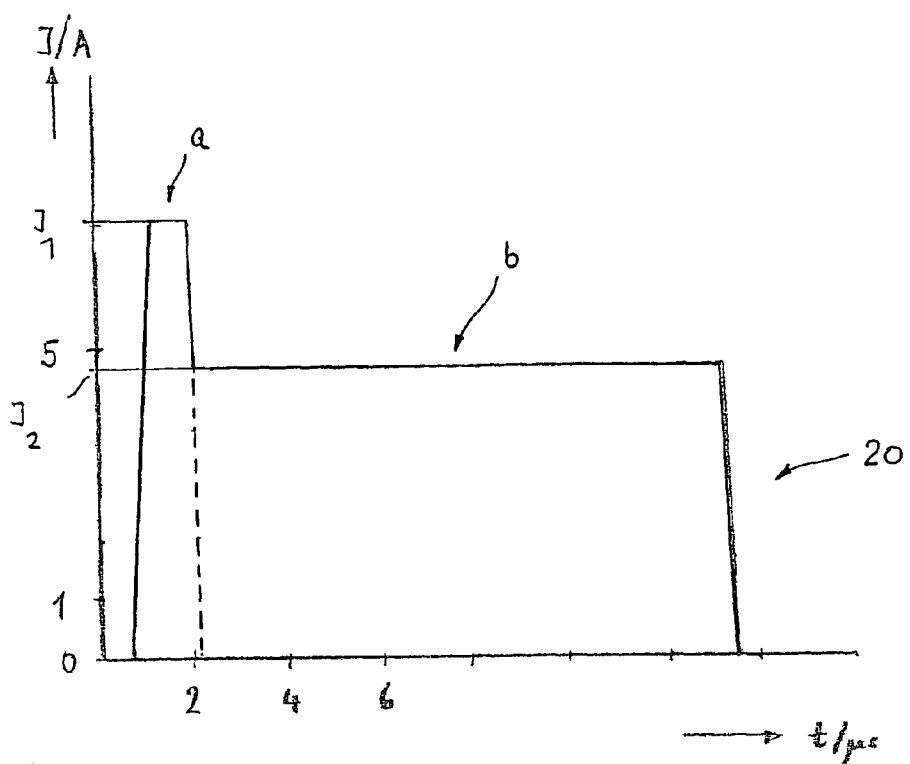
FIGS. 2 and 3 each show diagrams in which the current pulse for actuating the diode laser, i.e., the power output of the fiber laser optically pumped in this manner, are in each case plotted versus time.
Figure 3:
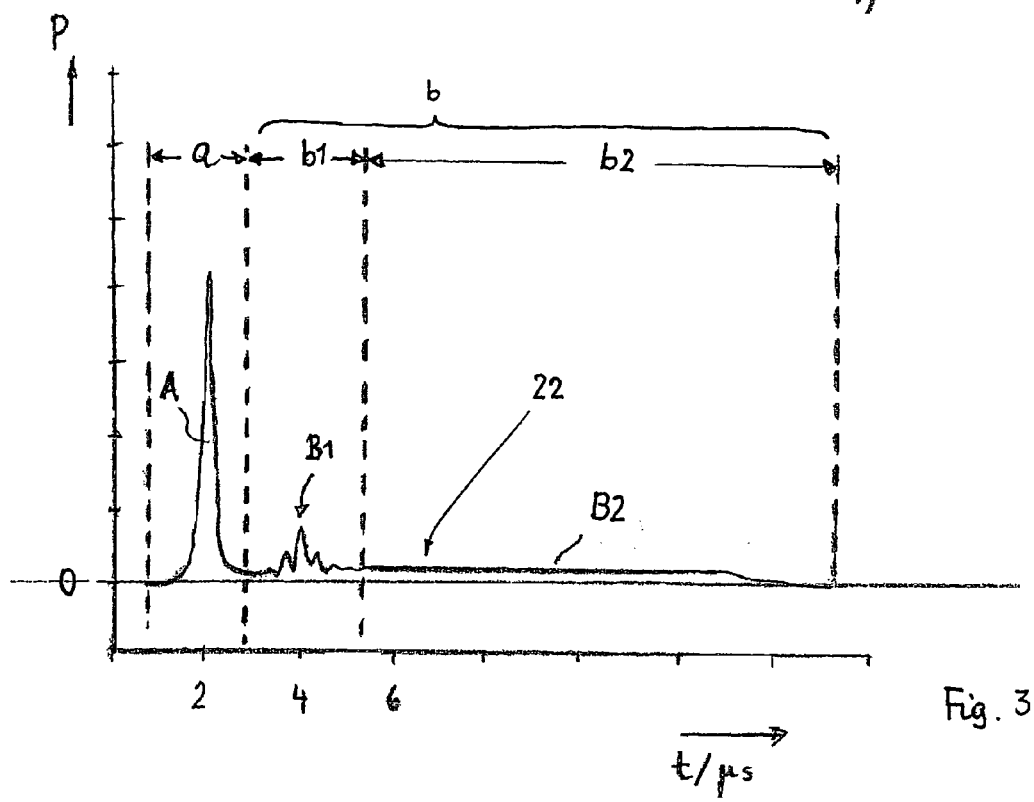

In the diagrams according to FIGS. 2 and 3, a typical temporal progression of a current pulse 20 flowing through the diode laser is contrasted with the laser pulse 22 generated by the fiber laser by means of a diode laser operated in this manner. The current pulse 20 illustrated in FIG. 2 has an approximately step-shaped configuration with a pronounced steep leading edge and a first section a having a first pulse height $I_1$, followed by a second section b having a second pulse height $I_2$ in which the current I is constant. The pulse heights P1 and P2 are different from one another. It is seen from FIG. 3 that, approximately 1 μs after the beginning of the current pulse in the first section a, a peak pulse appears in the form of an isolated primary initial laser pulse or relaxation pulse A, approximately 300 ns wide, which in a first subsection b1 of the second section b is followed by a small, less pronounced secondary relaxation pulse B1, which in a subsequent second substep b2 reaches a plateau B2 in which the fiber laser has changed to a CW mode with approximately constant power output. In other words, the fiber laser changes to CW mode after the primary relaxation pulse and several smaller secondary relaxation pulses, i.e., not necessarily directly after the relaxation pulse.

The height of the primary relaxation pulse A is essentially determined by the slew rate and first pulse height $I_1$ in the first section a of the current pulse 20 by which the diode laser is actuated. The magnitude of the CW power in the second subsection b2 is determined by the magnitude of the current I in the plateau for the current pulse 20. The CW power may be further stabilized by active control of the laser diode by determining the emitted laser power and using same as the controlled variable for the pulse height $I_2$ of the current pulse 20 in the second section b.

In principle it is possible to select the pulse duration of the current pulse 20 to be sufficiently small so that subsections b1 and b2 do not appear. In FIG. 2 a dashed line shows a pulse shape for the current pulse 20 in which only a primary relaxation pulse A appears.

A pulse shape of the laser beam which is adjusted by use of the shape of the current pulse is also maintained when the pulse frequency is varied, so that the pulse frequency of the fiber laser may be modified along with the feed rate of the workpiece. In addition to varying the pulse frequency, during machining ("on the fly") the pulse shape may also be modified to the particular cutting geometry, for example, tight curve radii which are mechanically critical regions in the workpiece.

The invention claimed is:

1. A method for generating a laser pulse useful in fine machining of a workpiece, comprising the steps of: optically pumping a laser fiber of a fiber laser with at least one diode laser;
    operating said at least one diode laser by a current pulse having an adjustable slew rate, an adjustable pulse height, and an adjustable pulse length; and
    adjusting said adjustable slew rate, said adjustable pulse height, and said adjustable pulse length to adapt to said laser fiber to generate a laser pulse consisting of a primary relaxation pulse.

2. The method of claim 1, further comprising the step of Q-switching said fiber laser to generate said primary relaxation pulse.

3. The method of claim 1, further comprising the step of operating said fiber laser on a stent.

4. The method of claim 1, further comprising the step of modifying a pulse frequency of said current pulse as a function of velocity of machining site movement relative to said workpiece.

5. The method of claim 1, further comprising the step of modifying a pulse shape of said current pulse to adapt to presented machining geometry.

6. A method for generating a laser pulse useful in fine machining of a workpiece, comprising the steps of:
    optically pumping a laser fiber of a fiber laser with at least one diode laser;
    operating said at least one diode laser by a current pulse having an adjustable slew rate, an adjustable pulse height, and an adjustable pulse length, and said current pulse comprising a first section having a first pulse height and at least one second section following said first section, said at least one second section having a second pulse height differing from said first pulse height;
    adjusting said adjustable slew rate, said adjustable pulse height, and said adjustable pulse length of said current pulse to adapt to said laser fiber to generate a laser pulse with a primary relaxation pulse; and dimensioning duration of said at least one second section with a constant current to change said fiber laser to a continuous wave (CW) mode with at least approximately constant power output after said primary relaxation pulse, further comprising the step of modifying a pulse frequency of said current pulse as a function of velocity of machining site movement relative to said workpiece.

7. A method for generating a laser pulse useful in fine machining of a workpiece, comprising the steps of:
   optically pumping a laser fiber of a fiber laser with at least one diode laser,
   operating said at least one diode laser by a current pulse having an adjustable slew rate, an adjustable pulse height, and an adjustable pulse length, and said current pulse comprising a first section having a first pulse height and at least one second section following said first section, said at least one second section having a second pulse height differing from said first pulse height;
   adjusting said adjustable slew rate, said adjustable pulse height, and said adjustable pulse length of said current pulse to adapt to said laser fiber to generate a laser pulse with a primary relaxation pulse: and
   dimensioning duration of said at least one second section with a constant current to change said fiber laser to a continuous wave (CW) mode with at least approximately constant power output after said primary relaxation pulse, further comprising the step of modifying a pulse shape of said current pulse to adapt to presented machining geometry.

* * * * *